(No Model.) 2 Sheets—Sheet 2.
S. O. JONES.
MEASURING DEVICE.
No. 592,736. Patented Oct. 26, 1897.
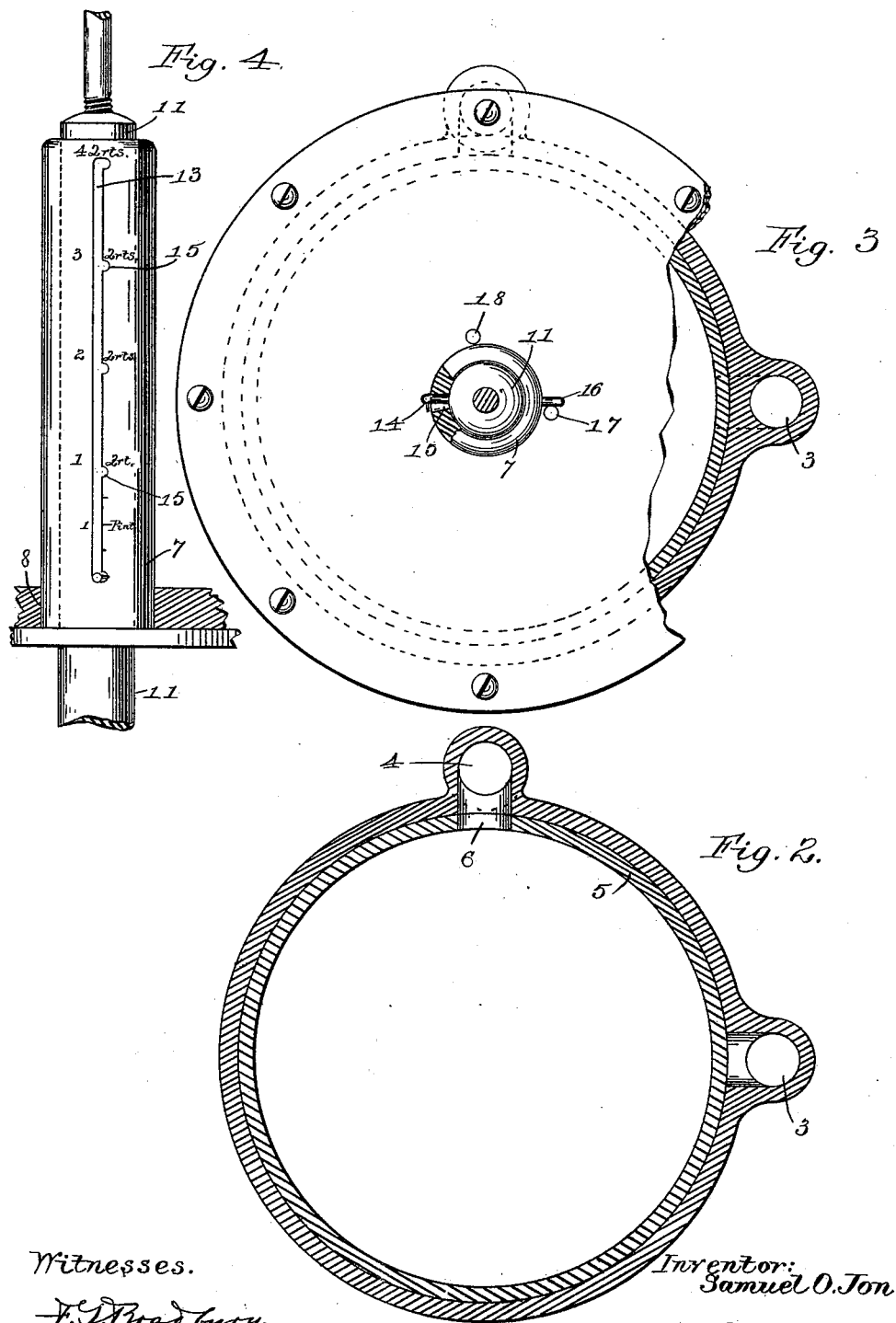
Witnesses.
F. T. Bradbury
A. S. Johnson
Inventor:
Samuel O. Jones
per: T. D. Merwin
Attorney.

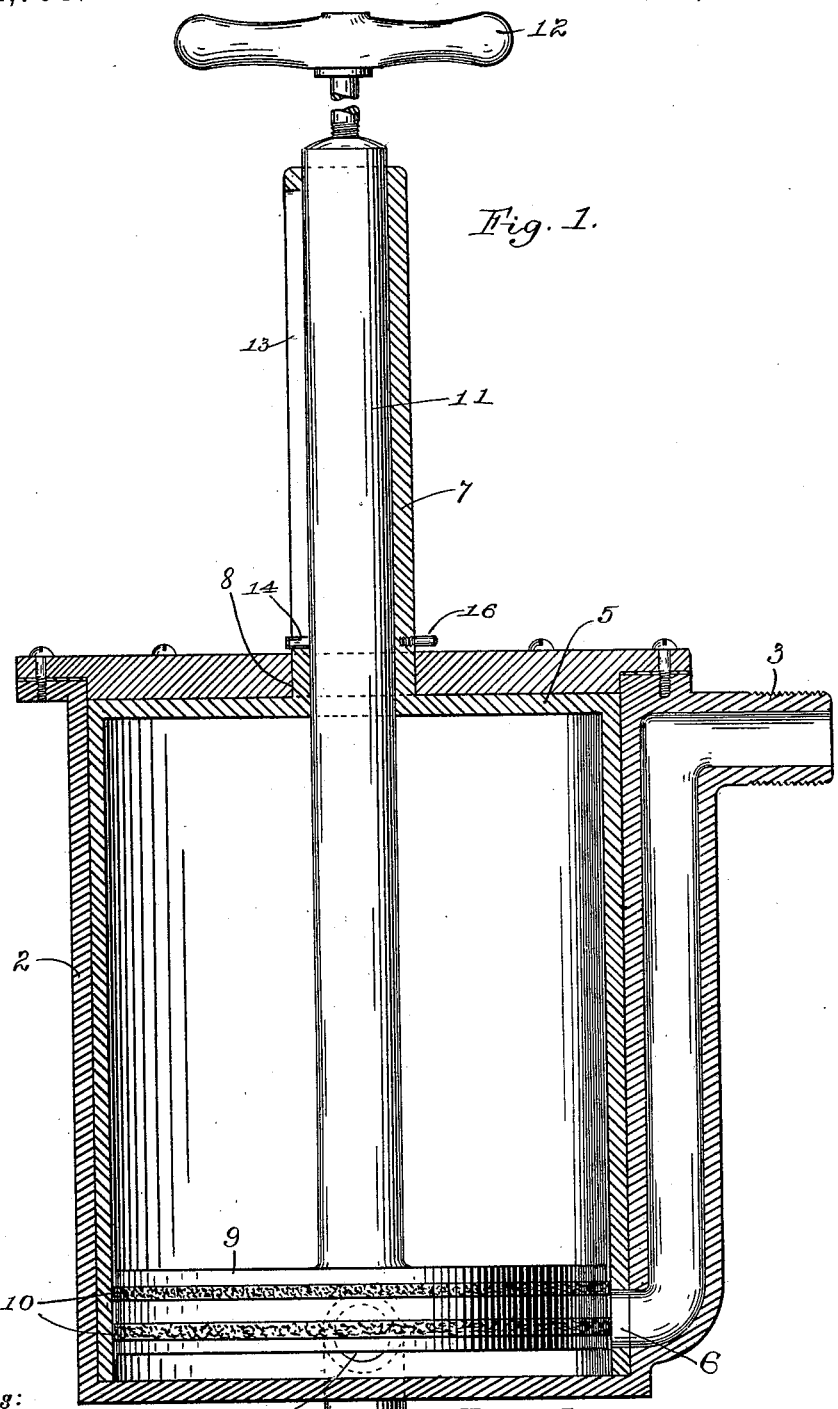

UNITED STATES PATENT OFFICE.

SAMUEL O. JONES, OF STILLWATER, MINNESOTA, ASSIGNOR OF ONE-HALF TO GEORGE H. ATWOOD, OF SAME PLACE.

MEASURING DEVICE.

SPECIFICATION forming part of Letters Patent No. 592,736, dated October 26, 1897.

Application filed March 9, 1896. Serial No. 582,376. (No model.)

*To all whom it may concern:*

Be it known that I, SAMUEL O. JONES, of Stillwater, Washington county, Minnesota, have invented certain Improvements in Measuring Devices, of which the following is a specification.

My invention relates to improvements in measuring devices, its object being to provide a device of this character adapted to be connected to a tank or other liquid reservoir and to be set so that when operated it will measure and deliver any desired quantity or measure of the contents of the tank within the limits of the capacity of the device.

My invention further consists in the construction and combination hereinafter particularly described and claimed.

In the accompanying drawings, forming part of this specification, Figure 1 is a vertical central cross-section of my invention. Fig. 2 is a horizontal cross-section of the inner and outer cylinder, taken through the inlet and outlet ports. Fig. 3 is a top plan view with the top partly broken away; and Fig. 4 is a detail of the upwardly-projecting neck of the inner cylinder, illustrating the graduated scale.

In the drawings, 2 represents the outer cylindrical case, one end of which is connected by means of the pipe 3 to the tank or reservoir, and having another pipe or conduit 4 connected to the same end of the cylinder, but at a sufficient angular distance therefrom to serve as an outlet or vent.

Within the case 2 is arranged another cylinder 5, having an opening or port 6, which is adapted to register with either one of the ports or openings of the inlet and outlet pipes by the rotation of the cylinder 5 and being formed with the neck 7, projecting through the opening 8 in the top of the outer cylinder. Within the inner cylinder is arranged the piston 9, having suitable packing-rings 10. The piston-rod 11 extends through the neck 7 of the inner cylinder and is provided with the lever or handle 12 or other suitable operating mechanism, by means of which the piston may be reciprocated in the cylinder. Formed in the side of the neck 7 is the vertical slot 13, having an adjacent graduated scale to indicate the proper position of the piston in the cylinder 5 to measure below it certain quantities, so that any desired amount up to the limit of the capacity of the inner cylinder may be indicated on the scale and the piston set by means of its operating-lever so as to permit the inlet into the cylinder of said quantities.

The piston-rod is provided with a pin or pointer 14, projecting through the slot 13 and adapted in the operation of the device to be turned into the notches 15, formed in the side of the slot at desired points. On the side of the neck 7 opposite the slot 13 is the projecting pin or stud 16, adapted to strike against the stop 17 when the inner cylinder is turned to register with the inlet-port and with the stop 18 when it is turned to register with the outlet-port.

The device is operated as follows: It having been first attached to the reservoir with the inner cylinder registering with the inlet-port of the outer cylinder, the piston-lever is operated to lift the piston until its pin 14 is brought into engagement with any desired one of the notches 15, the adjacent scale indicating the amount of contents of the cylinder. The operation of the piston is that of a suction-pump drawing the liquid from the reservoir into the cylinder beneath it. When the required amount, as indicated on the scale, has been thus drawn in, the cylinder is rotated until the pin 16 of the neck 7 strikes the stop 18, in which position the port 6 registers with the outlet-port of the outer cylinder. The piston then being depressed is driven downward in the cylinder, forcing the contents out through the outlet-port. The cylinder then being turned back to the first position, with the pin 16 resting against the stop 17, is in position to fill and be again operated. If the liquid to be measured is not free-flowing and there is danger of partial vacuum remaining in the inner cylinder when it is drawn into the same, the piston may be operated beyond the required point indicated on the scale, so as to draw in more than the required amount of the liquid. Then the motion of the piston being reversed the surplus is forced back into the reservoir, when the inner cylinder may be turned, so as to bring it in position for its contents to be expelled, as described.

I claim—

1. In a device of the class described, the combination of the outer cylinder having inlet and outlet ports, the second cylinder fitted within said first cylinder, and having a port adapted to register alternately with said outer cylinder-ports, the neck upon said inner cylinder projecting through the head of the outer cylinder, the piston in said inner cylinder with its rod working in said neck, and the pin on said piston-rod projecting through a longitudinal slot in said neck whereby by the turning of said piston-rod the inner cylinder is revolved, said pin also serving to indicate the amount of liquid in the cylinder.

2. In a device of the class described, the combination with the outer cylinder having inlet and outlet ports, the second cylinder rotatable within said first cylinder, and having a port adapted to be brought into registering position alternately with said outlet-ports, the neck upon said inner cylinder projecting through the head of the other cylinder, the piston in said inner cylinder provided with the rod working in said neck, and the interlocking connection between said rod and neck for locking the piston in suspended position to allow the inflow of a predetermined quantity of liquid into the cylinder, and for holding the piston in such suspended position while the inner cylinder is being turned to bring its port into registering position with the outlet-port of the outer cylinder.

In testimony whereof I affix my signature in presence of two witnesses.

SAMUEL O. JONES.

Witnesses:
H. S. JOHNSON,
MINNIE L. THAUWALD.